US012530856B2

(12) United States Patent
Afrasiabi

(10) Patent No.: US 12,530,856 B2
(45) Date of Patent: Jan. 20, 2026

(54) SELF-VALIDATING AUGMENTED REALITY INSPECTION OF A COMPONENT

(71) Applicant: The Boeing Company, Arlington, VA (US)

(72) Inventor: Amir Afrasiabi, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 139 days.

(21) Appl. No.: 18/603,774

(22) Filed: Mar. 13, 2024

(65) Prior Publication Data
US 2025/0292514 A1 Sep. 18, 2025

(51) Int. Cl.
G06T 19/00 (2011.01)
G06T 5/50 (2006.01)
G06V 10/764 (2022.01)
G06V 20/70 (2022.01)

(52) U.S. Cl.
CPC ............ *G06T 19/006* (2013.01); *G06T 5/50* (2013.01); *G06V 10/764* (2022.01); *G06V 20/70* (2022.01); *G06T 2207/20084* (2013.01); *G06T 2207/20221* (2013.01)

(58) Field of Classification Search
CPC .................. G06T 19/006; G06T 5/50; G06T 2207/20084; G06T 2207/20221; G06V 10/764; G06V 20/70
See application file for complete search history.

(56) References Cited

U.S. PATENT DOCUMENTS

| 11,022,566 | B1 * | 6/2021 | Alumot | G06F 30/398 |
| 2009/0136114 | A1 * | 5/2009 | Wu | G06V 10/24 |
| | | | | 382/141 |
| 2016/0284079 | A1 * | 9/2016 | Persely | G06T 7/0004 |
| 2021/0264670 | A1 * | 8/2021 | Kellner | G06T 7/0004 |

(Continued)

FOREIGN PATENT DOCUMENTS

EP 3404612 B1 * 11/2020 ........... G06V 20/653

OTHER PUBLICATIONS

Hamdi Ben Abdallah, Igor Jovancevic, Jean-Jose, and Ludovic Brethes, Automatic Inspection of Aeronautical Mechanical Assemblies by Matching the 3D CAD Model and Real 2D Images, Oct. 19, 2019, MDPI, Journal of Imaging, pp. 1-28 (Year: 2019).*

*Primary Examiner* — Jeffery A Brier
(74) *Attorney, Agent, or Firm* — Alleman Hall & Tuttle LLP

(57) ABSTRACT

A system and method for self-validating augmented reality inspection of a component are provided, including receiving an image of the component in a real world environment, determining a virtual camera pose relative to a CAD model of the component in a CAD environment that is substantially identical to the camera pose relative to the component in the world space, generating a CAD image at the virtual camera pose, removing background from the CAD image, generating a composite image by superimposing the masked CAD image on the image of the component in the real world environment, providing the composite image to a trained latching model to thereby make a latching determination of whether the CAD image is latched to the captured image of the component in the real world environment, where the latching model is trained on a dataset including ground truth composite image examples of latched and unlatched components.

20 Claims, 9 Drawing Sheets

(56) References Cited

U.S. PATENT DOCUMENTS

2023/0027216 A1\* 1/2023 Hollinger .............. G06F 18/214
2024/0153069 A1\* 5/2024 Schmitt ................... G06T 7/001
2025/0111603 A1 4/2025 Afrasiabi et al.

\* cited by examiner

TRAINING-TIME

*TRAINING-TIME*

*TRAINING-TIME*

*INFERENCE-TIME*

SELF-VALIDATING AUGMENTED REALITY INSPECTION OF A COMPONENT

FIELD

The present disclosure relates generally to aircraft inspection and, in particular, inspection of manufactured or assembled parts of aircraft using augmented reality and artificial intelligence.

BACKGROUND

In aircraft manufacturing, inspections of manufactured or assembled parts are performed to find defects and anomalies, and such inspections may utilize inspection aids such as tablet computers or other devices. However, existing inspection aids for visual inspection of components of the aircraft and their installation on the aircraft or sub-assemblies of the aircraft require human intervention to, for example, ensure the component or components being inspected are properly oriented and positioned such that the inspection results can be verified. While inspection with human experts is a reliable approach, it is nonetheless subject to human limitations on perception, concentration, and judgment, and can also be extremely labor intensive and time-consuming. The ability to promptly identify and validate aircraft component and component installation inspection results can improve the efficiency and accuracy of inspections as well as minimize potential delays due to rework. Moreover, there is a demand for additional automated inspection aids that can be used at a manufacturer's facility and also at other remote worksites, where there may be less expertise on potential issues and inspection criteria than at the manufacturer's facility.

SUMMARY

In view of the above, according to one aspect, a system for self-validating augmented reality inspection of a component is provided, including processing circuitry, communicatively coupled to non-volatile memory and instructions that, when executed by the processing circuitry, cause the processing circuitry to receive an image of the component in a real world environment captured by a camera oriented at a camera pose relative to a component in world space, determine a virtual camera pose relative to a CAD model of the component in a CAD environment that is substantially identical to the camera pose relative to the component in the world space, generate a CAD image via a virtual camera oriented at the virtual camera pose, generate a masked CAD image of the component by removing background from the CAD image, generate a composite image by superimposing the masked CAD image on the image of the component in the real world environment, provide the generated composite image to a trained latching model to thereby make a latching determination of whether the CAD image is latched to the captured image of the component in the real world environment, the trained latching model having been trained on a dataset including ground truth composite image examples of latched and unlatched components, and output the latching determination.

The features, functions, and advantages that have been discussed can be achieved independently in various embodiments or can be combined in yet other embodiments further details of which can be seen with reference to the following description and drawings.

DETAILED DESCRIPTION

Figure 1:
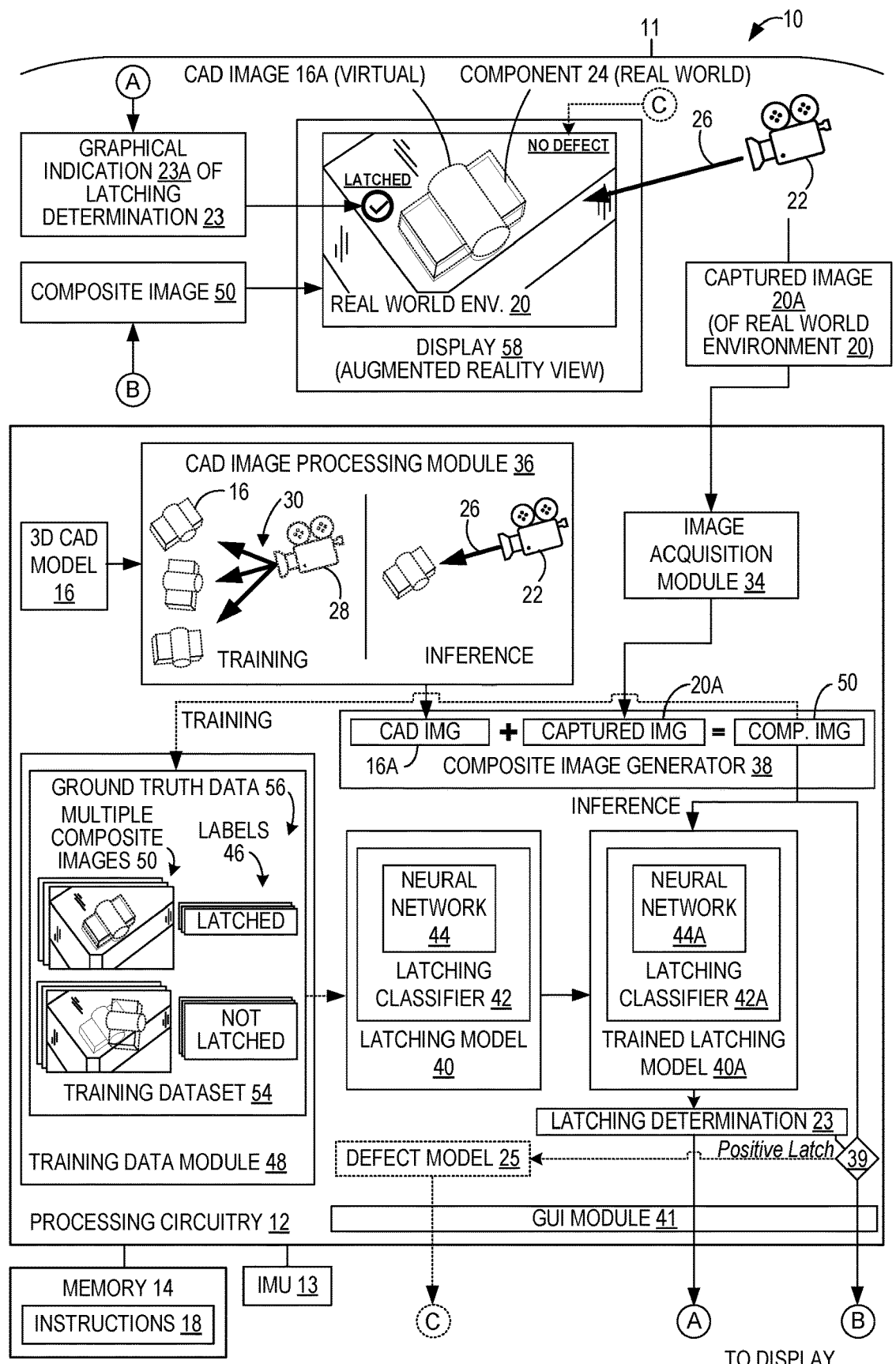
FIG. 1 is a general schematic diagram illustrating an overview of a system for self-validating augmented reality inspection of a component, showing both training and inference using a latching model, according to an embodiment of the subject disclosure.

In view of the above issues, as shown in FIG. 1, a computing system 10 for self-validating augmented reality inspection of a component 24 installed in an installation environment is provided. The component 24 is illustrated in a simplified manner as a bracket or bracket attachment. However, the component 24 can be any part, sub-assembly, or structure for another product or application. In one example application, the component 24 is an aircraft or spacecraft component. The installation environment in which the component is installed is typically a larger superstructure or assembly into which the component is installed, and thus may be an aircraft component assembly or spacecraft component assembly, for example.

As shown, the system 10 includes processing circuitry 12 communicatively coupled to non-volatile memory 14 and instructions 18 stored therein that, when executed by the processing circuitry 12, cause the processing circuitry 12 to execute the functions described herein. The computing system 10 can take the form of a computing device 11 that is mobile or handheld and includes a built-in camera 22, such as a smartphone, tablet computing device, head mounted augmented or virtual reality device, or laptop computer. Alternatively, the computing device 11 may be a personal computer, server, or other computing device, and camera 22 may be a peripheral or remote camera that is connected to the computing device via a data connection, such as a Bluetooth or Wi-Fi network connection. In either configuration, a user may navigate a real world environment to capture images of components installed in the environment.

FIG. 1 illustrates both training and inference phases performed by computing system 10, referred to as training time and inference time. First, a description of inference time using trained latching model 40A will be provided, followed by a description of training time during which the latching model 40 is trained to generate the trained latching model 40A.

At inference time, the processing circuitry 12 is configured to receive a captured image 20A of the component 24 in a real world environment 20 captured by a camera 22 oriented at a camera pose 26 relative to the component 24 in world space, which refers to three dimensional space in the real world environment 20. The image of the component 24 in the real world environment 20 can be received via an image acquisition module 34. As used herein, a camera pose refers to an orientation in a three dimensional coordinate system (such as world space or virtual space), and thus can be represented, for example, by a six degree of freedom (6DOF) vector containing values for x, y, z, pitch, roll, and yaw for each camera. The camera pose can be determined with reference to signals from an internal inertial measurement unit (IMU) 13 of the computing system 10, and alternatively or additionally using simultaneous localization and mapping techniques based on camera images of the environment to ascertain the position of the camera 22 in world space in the real world environment 20.

Continuing with inference-time, the processing circuitry 12 can include a CAD image processing module 36 for determining a virtual camera pose 30 of a virtual camera 28 relative to a CAD model 16 of the component in a CAD environment (virtual space) that is substantially identical to the camera pose 26 relative to the component 24 in world space in the real world environment 20. A CAD image 16A of the CAD model is generated via the virtual camera 28 oriented at the virtual camera pose 30. The CAD image 16A is a two-dimensional projection of the three dimensional CAD model 16 taken from the perspective of the virtual camera 28 with the virtual camera pose 30. The CAD image processing module 36 generates a masked CAD image 16A of the component 24 by removing background from the CAD image 16A. The mask is a transparent mask, such that only the CAD model 16 is visible in the masked CAD image 16A, and the background is removed.

The processing circuitry 12 can include a composite image generator 38, which receives the masked CAD image 16A of the component 24 from the CAD image processing module 36 and also receives the captured image 20A of the component 24 in the real world environment 20 from camera 22 via the image acquisition module 34. The composite image generator 38 then generates a composite image 50 by superimposing the masked CAD image 16A on the captured image 20A of the component 24 in the real world environment 20.

Further at inference time, the CAD image processing module 36 provides the generated composite image 50 to the trained latching model 40A to thereby make a latching determination 23 of whether, in the composite image, the CAD image is latched to the captured image of the component 24 in the real world environment 20. The latching determination 23 is passed from the trained latching model 40A to a graphical user interface module (GUI) 41. The GUI module 41 also receives the composite image 50 from the composite image generator 38. The GUI module 41 generates a graphical indication 23A of the latching determination 23. The GUI module 41 outputs the graphical indication 23A of the latching determination 23 and the composite image 50 to display 58. In the depicted example, the latching determination 23 is positive and the graphical indication is a check mark indicating the positive determination. Examples of a negative latching determination follow below.

In this manner, the display 58 can display an augmented reality view of the captured image 20A of the real environment 20 with CAD image 16A superimposed thereon in composite image 50, and further with the graphical indication 23A of the latching determination 23. In use, the display 58 may be configured to update the composite image in real time or close to real time, such that a user holding the computing device 11 can adjust the position of the device and camera to cause the CAD image 16A to be aligned with the component 24 in the real world 20, so that a positive latching determination can be made.

In some configurations, a negative latch determination itself may be output and a defect indicated on the display of the computing device, such as when a negative latch determination indicates a missing or misinstalled component. For this reason, the computing system described herein is referred to as "self-validating." However, in another configuration of the system a defect model 25 (shown in dashed lines) may be provided. In this configuration, when the latching determination is positive, as determined at decision block 39, the composite image 50 (or alternatively captured image 20A) may also be passed to the trained defect model 25, which has been trained to identify defects in components 24 in composite images 50 (or alternatively in captured images 20A). The trained defect model 25 has been trained using composite images 50 (or alternatively captured images 20A) of components 24 taken from particular predetermined angles (i.e., from predetermined defect model training-time camera poses), with ground truth defect labels for each image. In configurations in which a defect model is utilized, the latching determination 23 described herein is technically significant because it enables the defect model 25 to accurately classify the images it receives as containing defects or not, by ensuring that the composite image 50 (or captured image 20A) is taken from a similar or the same camera pose as original images on which the defect model was trained. For this reason, the virtual camera poses 30 used to generate the training dataset 54 are chosen to be the same or substantially similar to the defect model training-time camera poses. In configurations in which a defect model 25 is utilized, the computing system is self-validating in that it validates the captured images or composite images sent to the defect model, to increase the accuracy of the classifications by the defect model 25.

Turning now to the training of trained latching model 40A, processing circuitry 12 further is configured to implement a training data module 48 configured to generate a training dataset 54 that is used to train the latching model 40 at training time prior to inference time. At training time, an untrained (or not fully trained, in the case where pre-training is conducted) latching model 40 is trained on the training dataset 54 including ground truth data 56 comprised of composite images 50 and associated ground truth labels 46 indicating whether each composite image 50 shows a latched CAD image and captured image 20A of the component 24 in the real world (i.e., a training dataset 54 of composite images in which each image is labeled as "latched" or "unlatched"), to thereby produce trained latching model 40A. The untrained (or not fully trained) latching model 40 includes an untrained latching classifier 42, which may include an untrained neural network 44. Thus, the trained latching model 40A includes a trained latching classifier 42A, which utilizes a trained neural network 44A that has been trained to output a latching determination 23, which in turn can then be output to a display 58 in the form of a graphical indication 23A of the latching determination 23.

Figure 2:
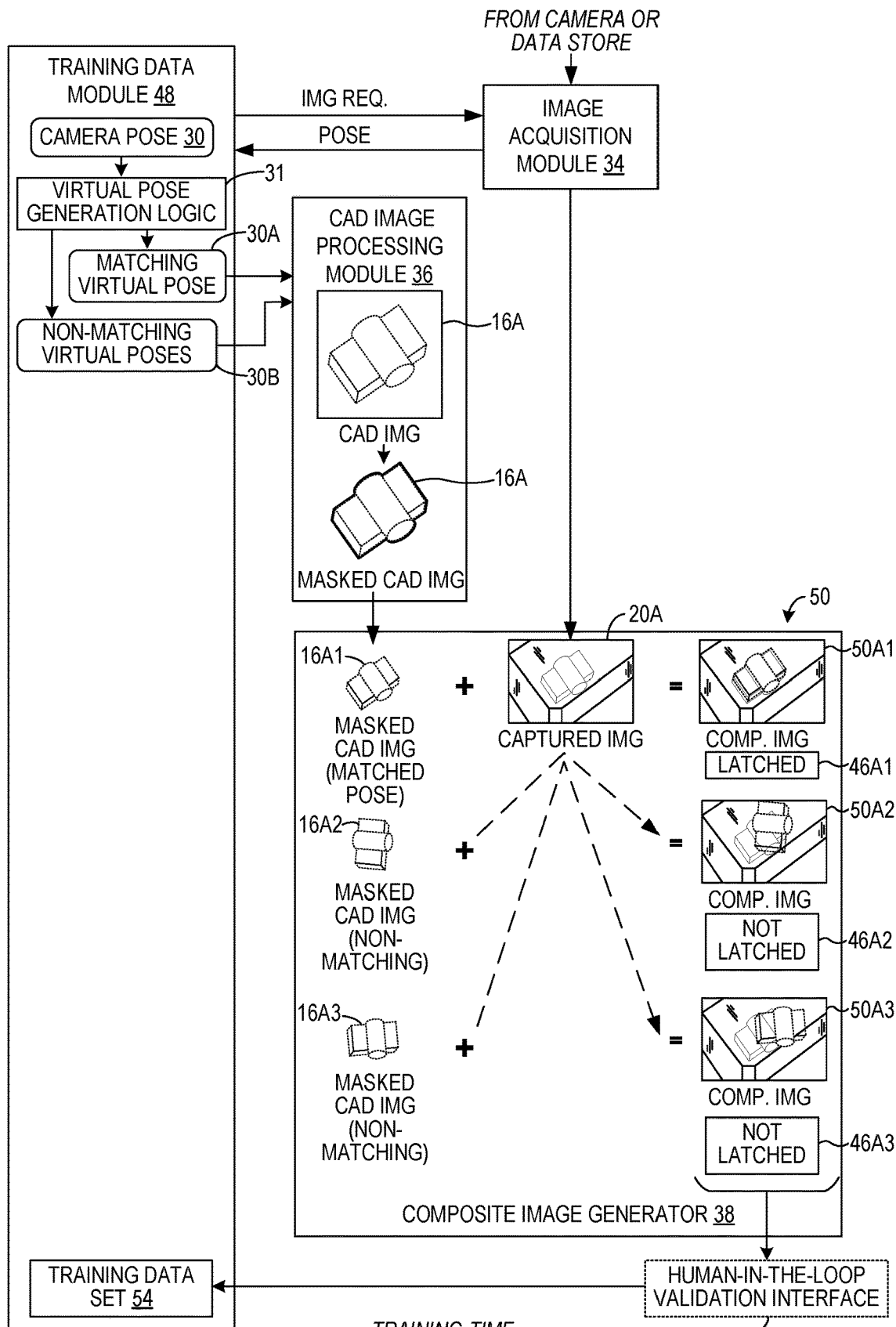
FIG. 2 is a schematic diagram illustrating in detail training of the latching model of the system of FIG. 1.

FIG. 2 provides a schematic diagram illustrating the training of the latching model 40 of computing system 10 of FIG. 1. As shown, the training data module 48 is configured to implement a training dataset 54 generation algorithm as follows. The training data module sends an image request to the image acquisition module 34. In return, the image acquisition module 34 acquires a captured image 20A, and returns to the camera pose 26 of the camera 22 for the captured image 20A. The camera pose 26 may be determined from metadata of the IMU 13 as described above, or using image processing techniques on the captured image 20A to infer a camera pose 26. In another configuration, the camera pose 26 may be output by a robotic camera system that can programmatically position the camera to a desired pose.

In some inspection regimes, a multitude of arbitrary camera poses 26 are utilized, to train the latching model 40 to detect latching during inspection from any arbitrary camera pose 26 relative to the component 24 under inspection. This approach may offer sufficient quality when the inspection is merely detecting the presence or absence of the component in the proper location and orientation in the environment. In other inspection regimes requiring more precise alignment, such when examining for difficult to detect defects such as oxidation, paint chips, scratches, or dents, one or a set of predetermined camera poses 26 may be decided ahead of time, such that training and inference occur using a predefined set of one or more camera poses 26. Such an approach can improve the accuracy of the computing system.

To generate the training data set 54, the training data module 48 is configured to receive a training time captured image of a training time component in a real environment. The training data module 48 passes the camera pose 26 for the training time captured image to virtual pose generation logic 31, which in turn commands the CAD image processing module 36 to generate a plurality of CAD images 16A. First, the virtual pose generation logic 31 determines a matching virtual pose 30A within a CAD program environment that is substantially identical to the camera pose 26 in world space relative to the component in the training time captured image. The virtual pose generation logic 31 then sends the matching virtual pose 30A to the CAD image processing module with a command to generate a matching CAD image 16A1 that includes the CAD model as captured by the matching virtual camera pose 30A in the CAD program environment. This matching CAD image 16A1 is first generated and then a mask is created and the background removed, to thereby generate a masked CAD image 16A1 with a transparent background. The masked CAD image 16A1 is superimposed on the captured image 20A in the manner described above to generate a latched composite image 50A1, that can be labeled with a positive latch ground truth label 46A1. It will be appreciated that the CAD images 16A can be generated to be fully opaque or partially transparent, as desired. When opaque, they can be generated to be photorealistic through the application of lighting, textures, etc. that match the real environment 20.

To generate the negative training example training data pairs, for each pair, image acquisition module receives the training time captured image of the training time component in the real environment in the positive training example data pair described above. To provide a robust variety of negative examples for training, the training data module 48 is configured to generate a variety of non-matching virtual poses 30B that do not match the camera pose 26. The training data module 48 is configured to send each of the variety of non-matching poses 30B along with a command to generate CAD images for each, to the CAD image processing module 36. In response, the CAD image processing module 36 generates negative examples, such as non-matching CAD image 16A2 and non-matching CAD image 16A3, and generates masked non-matching CAD images 16A2, 16A3 from each by removing the background. As shown, the composite image generator 38 is configured to superimpose these masked non-matching CAD images 16A2, 16A3 onto respective instances of the same captured image 20A. In this way, for the same captured image 20A, at least one positive training example (composite image 50A1 labeled latched), and one or more negative training examples (composite images 50A2, 50A3 labeled not latched) are generated. Following generation of these training examples, they can be displayed to a human expert for human-in-the-loop validation interface 71 for human input validating the ground truth labels. Composite images 50 and labels 46 that are validated are returned to the training data module 48 as training data set 54. Alternatively, the training dataset 54 can be exported to the training data module 48 without human validation. In such a case, a programmatic validation process can be used. The process can be repeated for multiple captured images 20A taken from different camera poses 26 and/or in different environmental conditions (lighting, temperature, air quality, condensation, etc.). In this manner, a validated training data set 54 can be generated with both positive and negative examples under a variety of conditions.

Figure 3:
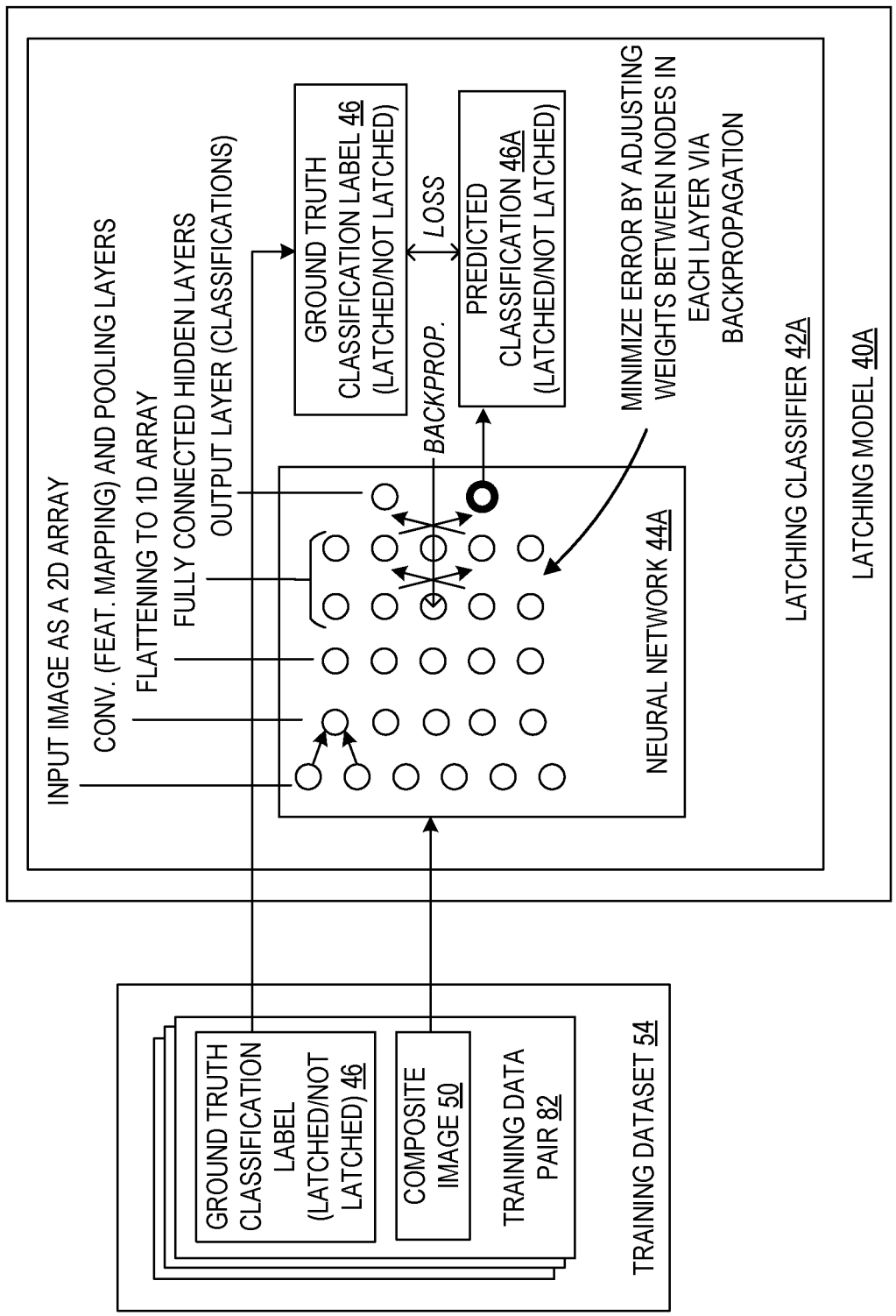
FIG. 3 is a schematic diagram further illustrating training of the latching model of FIG. 1.

Turning to FIG. 3, a schematic diagram is shown illustrating training of the latching model 40 using the training dataset 54 generated in FIG. 2. The training dataset 54 includes training data pairs 82. Each training data pair 82 includes a composite image 50 and a corresponding ground truth classification label 46, such as a positive classification label (i.e., latched) or a negative classification label (i.e., not latched). Each composite image 50A can be input to the neural network as a 2D array. In other embodiments, multiple channels can be used, such as a 2D (image) array of pixels for more than one channel, such as three channels (e.g., RGB) or four channels (e.g., RGB-D). However, for simplification of explanation, an embodiment whereby the input image is a 2D array is described herein.

Once the composite image 50A is input as a 2D array into the neural network 44, the 2D array is passed through one or more convolutional layers (for feature mapping) and pooling layers (for reducing dimensions of downstream fully connected hidden layers by reducing dimensions of the feature maps generated via the convolutional layers). Prior to passing to fully connected hidden layers, the 2D array is flattened to a 1D array, then passed to the fully connected hidden layers and an output layer consisting of the (latched and unlatched) classifications to yield a predicted classification label 46A (e.g., latched or not latched). For each prediction based on each input, the predicted classification 46A is compared to the ground truth classification label 46 to determine if there is any error. Accordingly, a loss function is applied and loss is computed between the ground truth classification label 46 (ground truth) for each composite image 50 and the predicted classification label 46A for that composite image. A backpropagation algorithm can be used to train the neural network by adjusting weights between nodes in each layer of the fully connected hidden layers of the neural network 44, to minimize the error. This process is repeated for each training data pair 82 in the training dataset 54. The result is a trained latching model 40A, including a trained neural network 44A that functions as a trained latching classifier 42A. Once trained as described, the trained latching model 40 includes a neural network 44 that is configured to, at inference-time, receive a generated composite image and in response classify the generated composite image as latched or unlatched.

Figure 4:
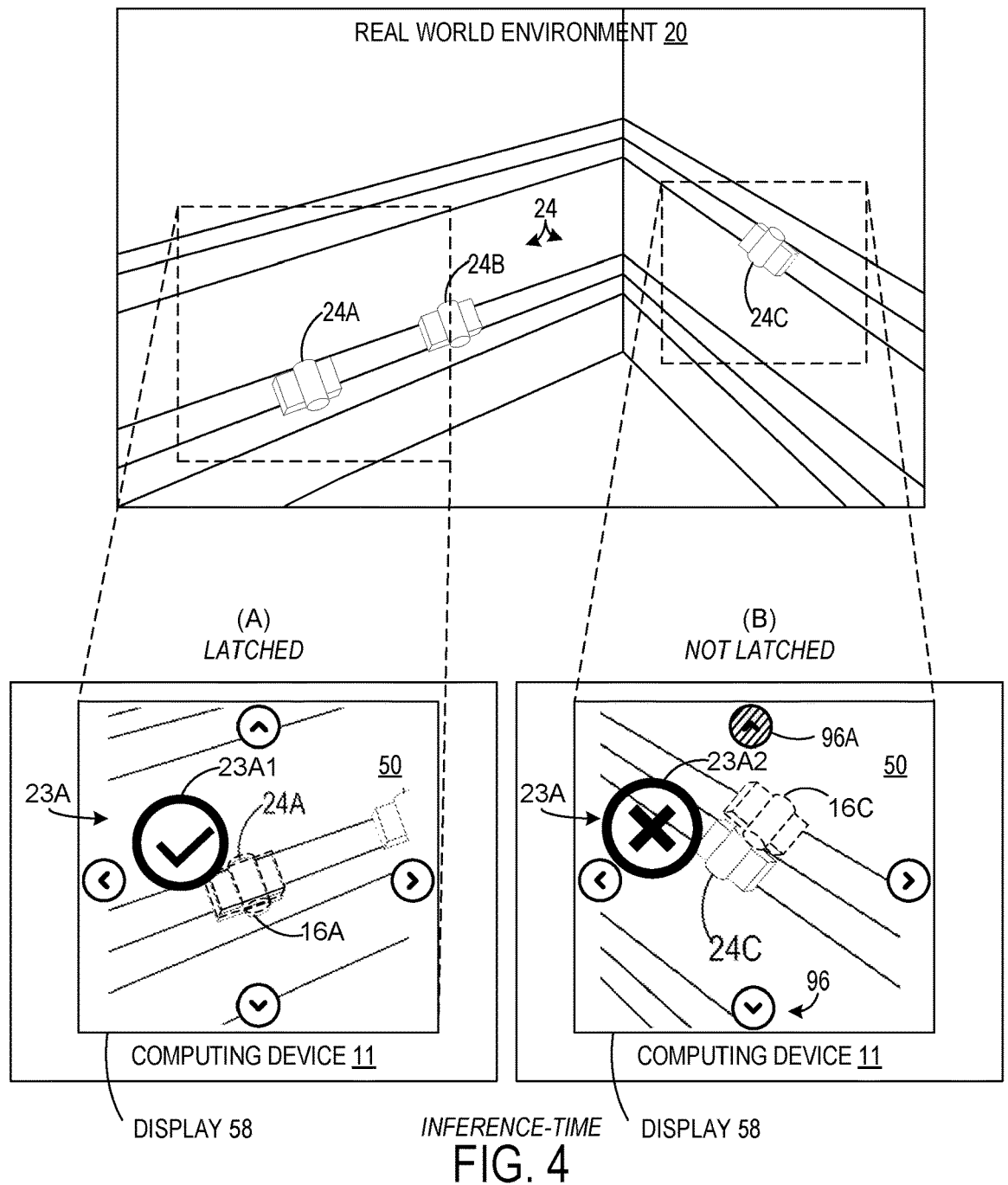
FIG. 4 is an illustration of an augmented reality device of the system of FIG. 1, displaying an indication of a latching determination.

Turning now to FIG. 4, an example of computing device 11 of FIG. 1 imaging a real world environment 20 is illustrated. Components 24A-24C are installed in the real world environment 20. Computing device 11 in this implementation can be configured as a mobile computing device such as a smartphone or tablet with a rear facing camera for camera 22 and a front facing display for display 58. The computing device 11 is shown capturing images of two different locations in the real world environment 20, and for each displaying a composite image 50. As described above, the composite image 50 includes a masked CAD image 16A and an image of the component 24 in the real world environment. The composite image 50 is provided to the trained latching model 40, which outputs a latching determination indicating whether the CAD image 16A is latched or not latched to the captured image of the component 24 in the real world environment 20. Based on the latching determination, the computing device 11 is configured to display a graphical indication 23A of the latching determination on the display 58.

FIG. 4 at (A) illustrates an example with a positive latching graphical icon 23A1. To make a positive latching determination, the trained latching model 40A detected that the CAD image 16A substantially or completely overlaps the image of the component 24A in the real world environment 20, and the boundaries of each of the component 24A and the projected CAD model in CAD image 16A are of similar size and shape. Once the composite image 50 with the positive latch determination is obtained, the composite image 50 can be saved in storage as evidence that the latched component was present, and/or passed on to defect model 25 of FIG. 1, for defect analysis.

FIG. 4 at (B) illustrates a negative latching graphical icon 23A2. In FIG. 4, the latching model has made a negative latching determination by detecting that the CAD image 16C and component 24C do not overlap or have boundaries of similar size and shape. Navigation icons 96 are provided to indicate to the user a direction to move the computing device to align the component 24 in the captured image with the CAD image 16A. As shown, an upwardly pointing navigation icon 96A is highlighted to indicate to the user to move the computing device with camera upward, in an attempt to align the component 24C and CAD image 16C.

Figure 5:
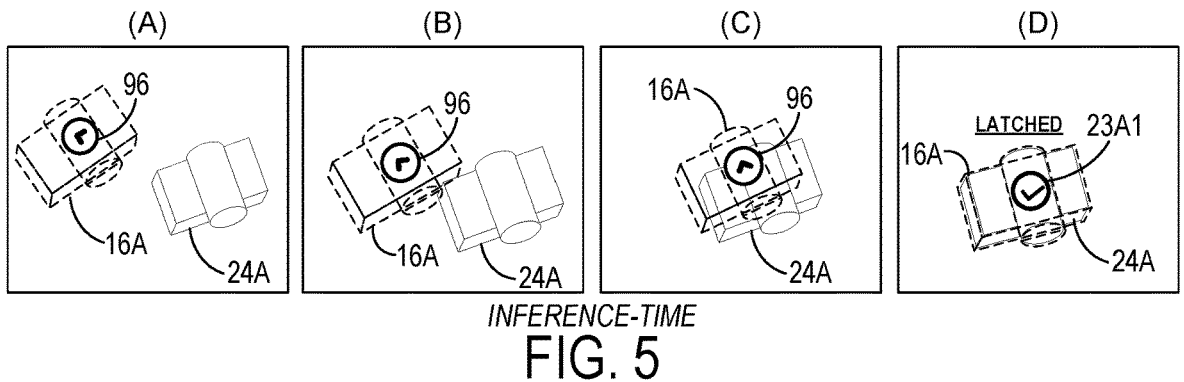
FIG. 5 illustrates a time series of composite images taken prior to obtaining a positive latching determination in FIG. 4.

FIG. 5 illustrates a time series of composite images 50 taken prior to obtaining the positive latch determination of FIG. 4 at (A). As shown at FIG. 5 at (A)-(C), in this example a navigational icon is displayed on or adjacent the CAD image 16A, which includes an arrow pointing in a direction the user should move the camera to align the CAD image with the component 24. Once a latching determination is made, as shown at (D) in FIG. 4, then the positive latching graphical icon 23A1 is displayed.

Figure 6A:
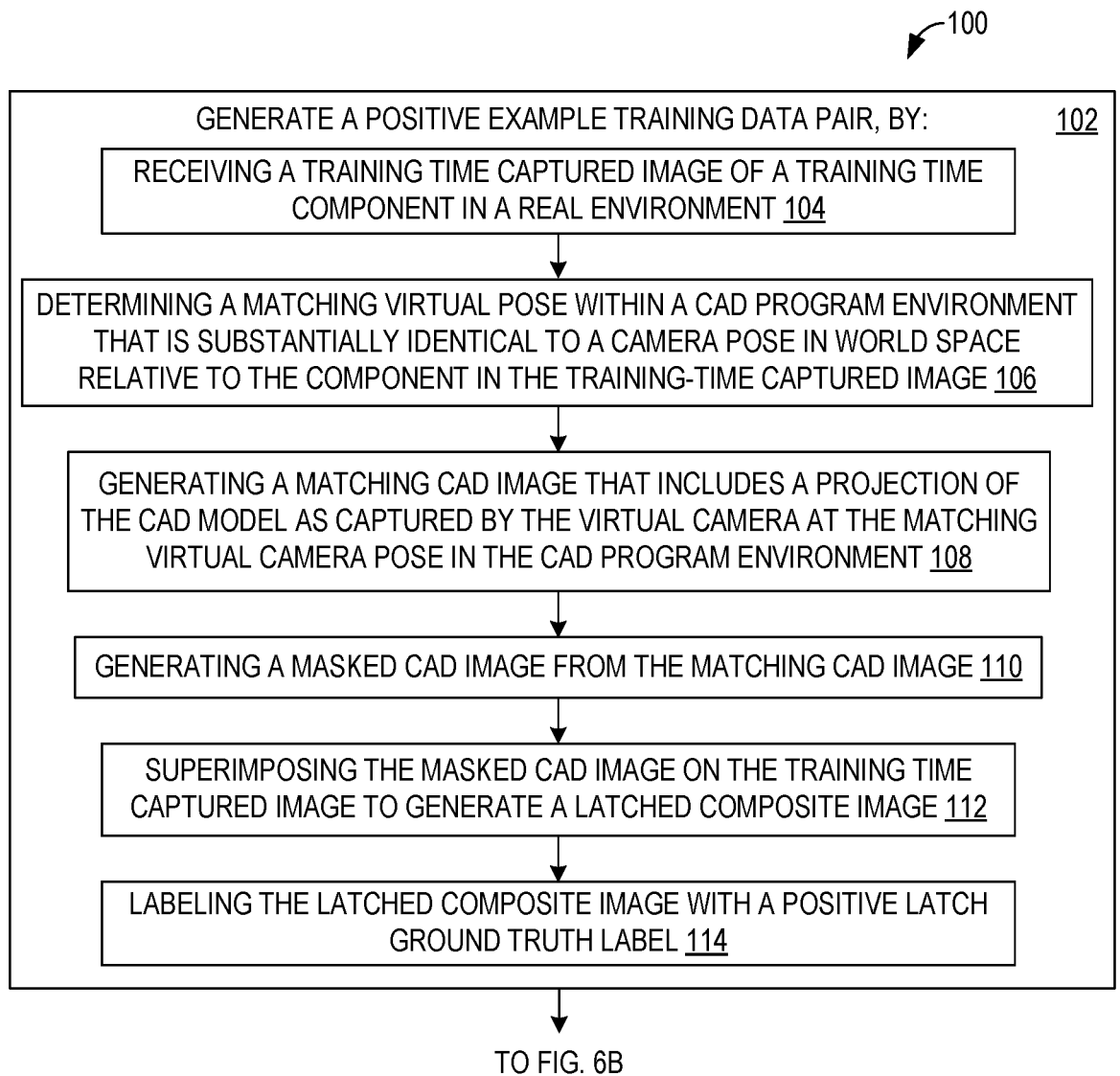
FIGS. 6A and 6B provide a flowchart of a method for training a latching model, according to an embodiment of the subject disclosure.
Figure 6B:
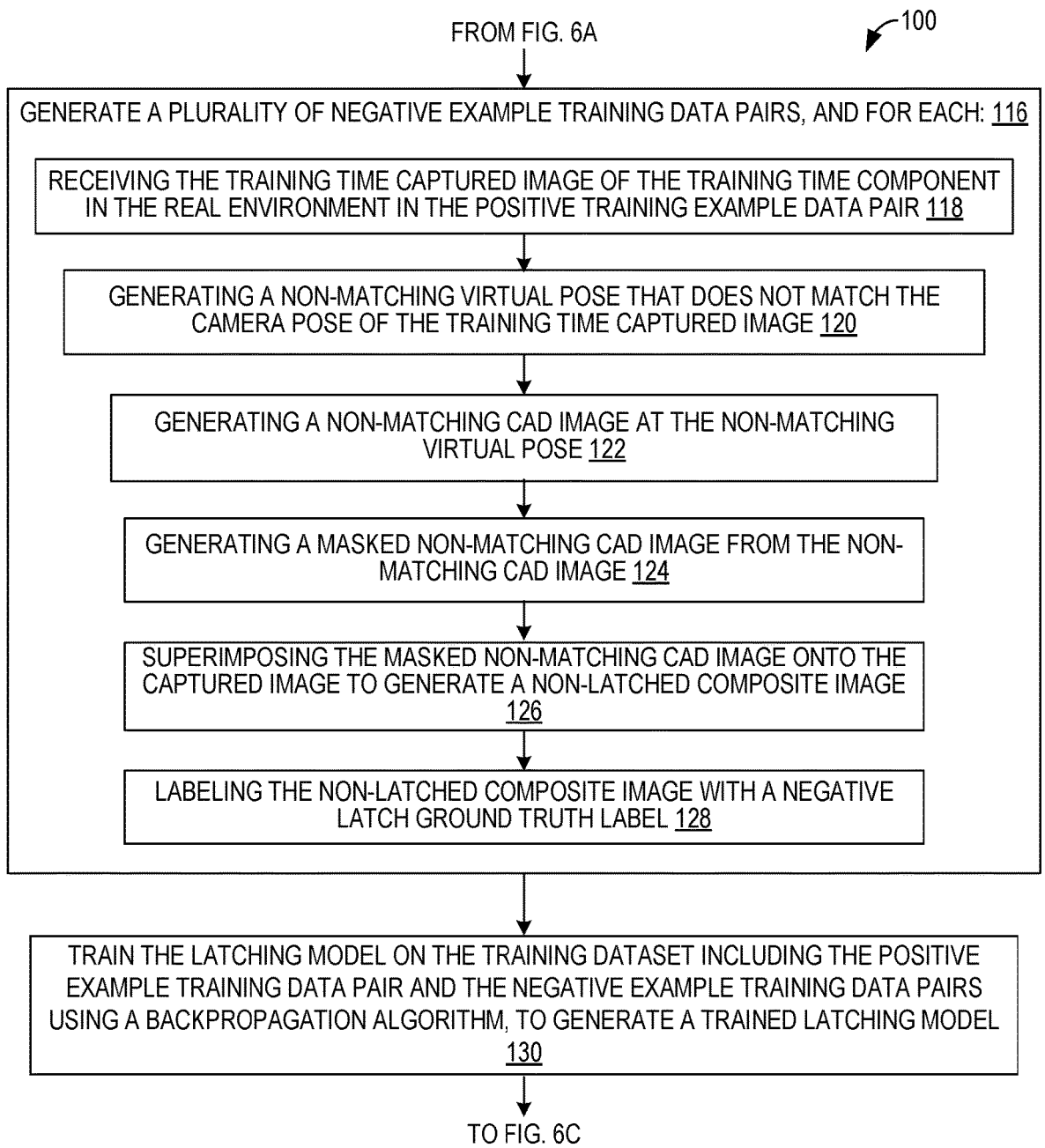
Figure 6C:
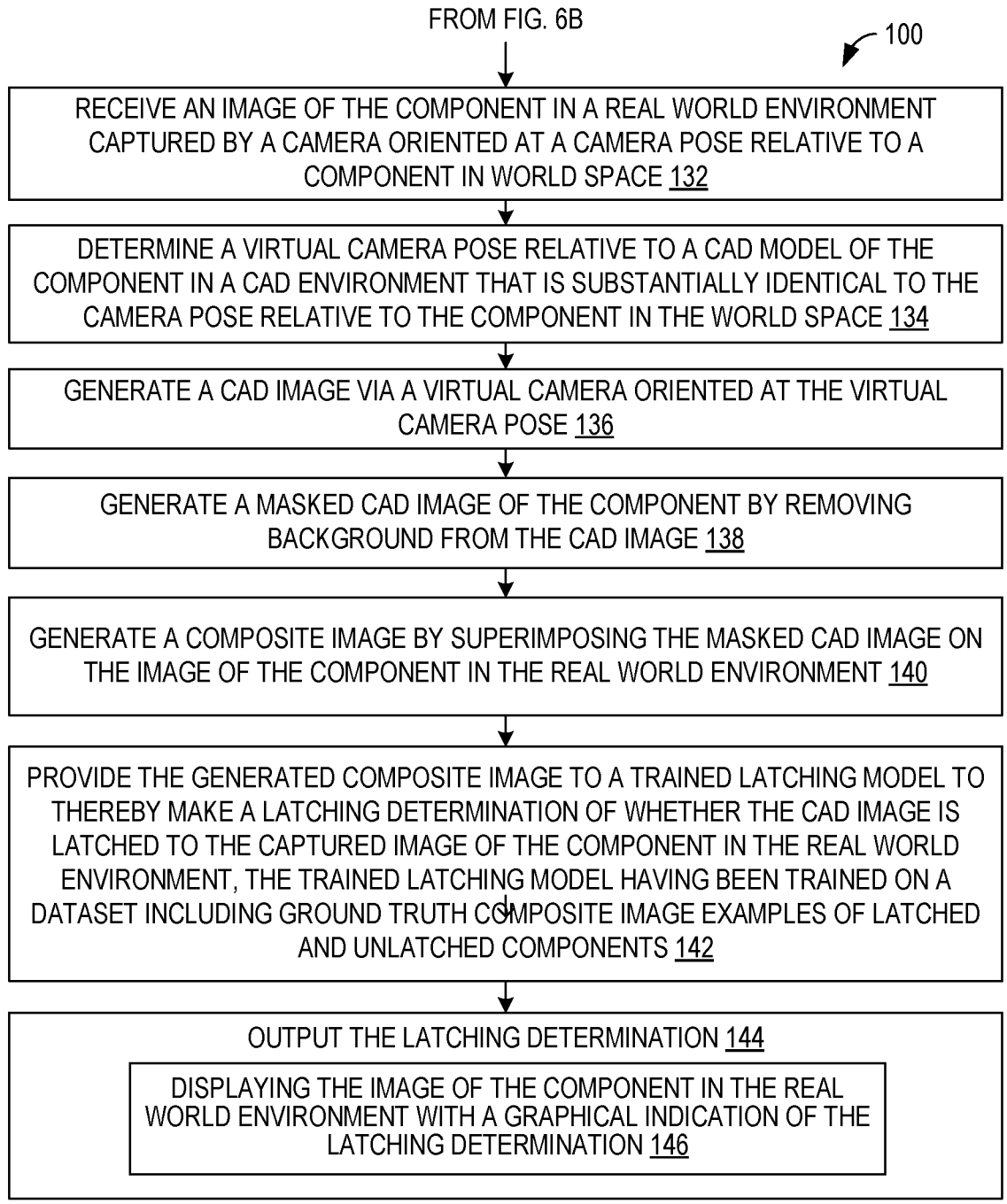
FIG. 6C illustrates method steps for performing inference using the trained latching model of FIGS. 6A and 6B.

FIGS. 6A-6C illustrate a method for training and performing inference using a latching model, according to an example implementation of the present disclosure. FIGS. 6A and 6B illustrate method steps for training the latching model, while FIG. 6C illustrates method steps for performing inference using the trained latching model. It will be appreciated that the method may be implemented using the software and hardware components described above and shown in FIGS. 1-5. It will be appreciated that method 100 also can be performed in other contexts using other suitable hardware and software components. In particular, training-time method steps in FIGS. 6A and 6B can be performed on different computing devices than the method steps in FIGS. 6C, and thus the processing circuitry used to perform these steps may be distributed in different computing devices.

At training time, method 100 includes generating a training dataset at least in part by, at 102 generating a positive example training data pair. Typically, step 102 is performed multiple times to generate multiple positive example training data pairs. Each positive example training data pair is generated at least in part by performing steps 104-114. At 104, method 100 includes receiving a training time captured image of a training time component in a real environment. At 106, method 100 includes determining a matching virtual pose within a CAD program environment that is substantially identical to a camera pose in world space relative to the component in the training-time captured image. At 108, the method includes generating a matching CAD image that includes a projection of the CAD model as captured by the virtual camera at the matching virtual camera pose in the CAD program environment. At 110, the method includes generating a masked CAD image from the matching CAD image. At 112, method 100 includes superimposing the masked CAD image on the training time captured image to generate a latched composite image. And, at 114, method 100 includes labeling the latched composite image with a positive latch ground truth label. From step 114, the method proceeds to 116 in FIG. 6B.

At 116, method 100 further includes, at training time, further generating the training dataset at least in part by generating a plurality of negative example training data pairs. Typically, step 116 is performed at least once for each positive training data pair generated at 102, to generate corresponding negative training example data pairs. Each negative training data pair is generated by performing at least steps 118-128. At 118, the method includes receiving the training time captured image of the training time component in the real environment in the positive training example data pair. At 120, the method includes generating a non-matching virtual pose that does not match the camera pose of the training time captured image. If desired, on each pass through step 120, random sampling (or random generation) of non-matching virtual camera poses may be performed to generate a variety of non-matching virtual poses at 120. At 122, the method includes generating a non-matching CAD image at the non-matching virtual pose. At 124, the method includes generating a masked non-matching CAD image from the non-matching CAD image. At 126, the method includes superimposing the masked non-matching CAD image onto the captured image to generate a non-latched composite image. At 128, the method includes labeling the non-latched composite image with a negative latch ground truth label.

At 130, the method further includes training the latching model on the training dataset including the positive example training data pair and the negative example training data pairs using a backpropagation algorithm, to generate a trained latching model. As an alternative to using both positive and negative examples, in an alternative training process only positive example training data pairs can be used to train the latching model. From 130, the method proceeds to FIG. 6C. As described above, the latching model may include a convolutional neural network, and may be configured as a binary classifier.

FIG. 6C illustrates method steps performed at inference time for self-validating augmented reality inspection of a component, and may be performed in a different computing device than the steps in FIGS. 6A-6B. At 132, method 100 includes, at inference time, receiving an image of the component in a real world environment captured by a camera oriented at a camera pose relative to a component in world space. At 134, the method includes determining a virtual camera pose relative to a CAD model of the component in a CAD environment that is substantially identical to the camera pose relative to the component in the world space. At 136, the method includes generating a CAD image via a virtual camera oriented at the virtual camera pose. At 138, the method includes generating a masked CAD image of the component by removing background from the CAD image. At 140, the method includes generating a composite image by superimposing the masked CAD image on the image of the component in the real world environment. At 142, the method includes providing the generated composite image to a trained latching model to thereby make a latching determination of whether the CAD image is latched to the captured image of the component in the real world environment. It will be appreciated that the trained latching model has been trained in the manner described above on a training dataset including a plurality of training dataset pairs, each pair including a composite image and a ground truth label indicating whether the composite image depicts a component and CAD image that are latched or unlatched. At 144, the method further includes outputting the latching determination. As shown at 146, outputting may include displaying the image of the component in the real world environment with a graphical indication of the latching determination. The displayed graphical indication can be a positive latch graphical indication or a negative latch graphical indication, examples of which are shown in FIG. 4, depending on the latch determination.

As described above, the trained latching model can include a neural network that is configured to, at inference-time, receive the generated composite image and in response classify the generated composite image as latched or not latched. The neural network can comprise one or more convolutional layers and a plurality of fully connected hidden layers, as discussed above. Further, the neural network can be configured as a binary classifier including an output layer coupled on an output side of the hidden layers, the output layer including at least one node corresponding to a positive latching determination, as described above.

Figure 7:
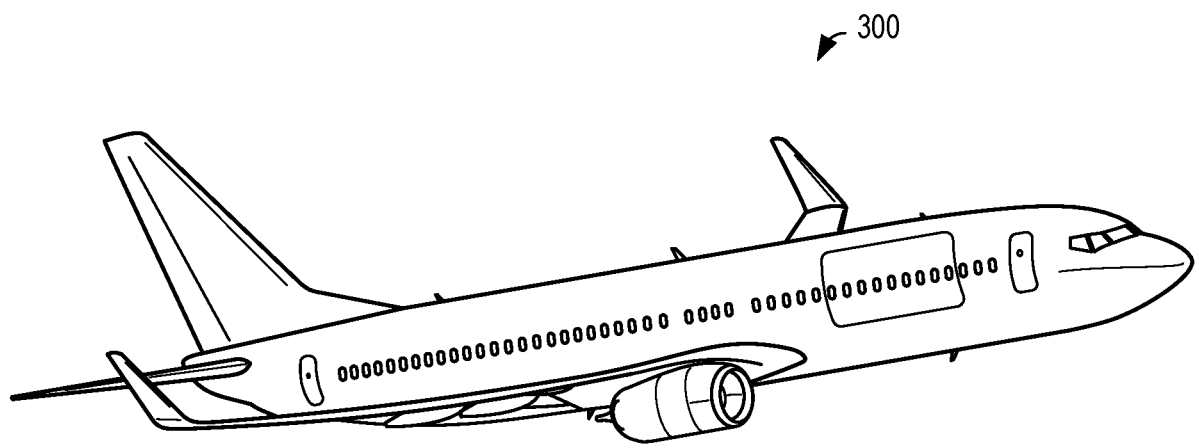
FIG. 7 is an illustration of an aircraft that can be inspected by the system of FIG. 1 and method of FIGS. 6A-C, according to an example application of the subject disclosure.

Turning now to applications of the techniques described above, FIG. 7 is an illustration of an aircraft 300 that incorporates components that can be inspected by the system of FIGS. 1-5 and the methods of FIGS. 6A-6C. For example, aircraft 300 includes mechanical fasteners, electrical connectors, structural components, body panels, etc. that can be the component under inspection described above. These are merely illustrative examples and it should be appreciated that other types of vehicles and components can be inspected by the systems and methods described herein as well.

The systems and processes described herein have the potential benefit of enabling self-validating augmented reality (AR) inspection of a component and/or component installation using artificial intelligence (AI). The systems and processes described include using an artificial intelligence model trained using a classifier that determines whether the 3D CAD image superimposed over the real-life environment image is latched (overlapping the component) onto the real-life view in order for the visual inspection to be valid, thereby providing a self-validating AR system. Further, an AI model is included that is trained using a classifier that determines whether a latched composite image has been obtained, which can be used alone or in combination with a defect model to determine whether a defect is likely present in the component and/or component installation.

Figure 8:
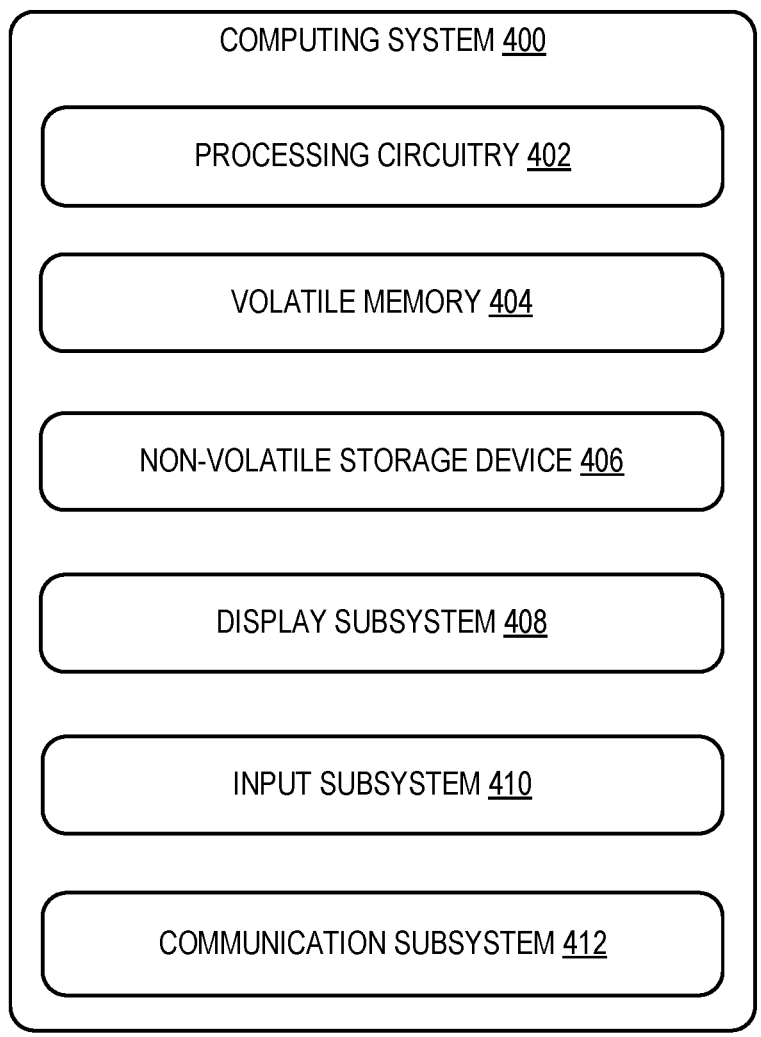
FIG. 8 is a schematic diagram illustrating an exemplary computing system that can be used to implement the system of FIG. 1.

FIG. 8 schematically shows a non-limiting embodiment of a computing system 400 that can enact one or more of the methods and processes described above. Computing system 400 is shown in simplified form. Computing system 400 can embody the computing system 10 described above and illustrated in FIG. 1. Components of computing system 400 can be included in one or more personal computers, server computers, tablet computers, home-entertainment computers, network computing devices, video game devices, mobile computing devices, mobile communication devices (e.g., smartphone), and/or other computing devices, and wearable computing devices such as smart wristwatches and head mounted augmented reality devices.

Computing system 400 includes processing circuitry 402, volatile memory 404, and a non-volatile storage device 406. Computing system 400 can optionally include a display subsystem 408, input subsystem 410, communication subsystem 412, and/or other components not shown in FIG. 8.

Processing circuitry 402 typically includes one or more logic processors, which are physical devices configured to execute instructions. For example, the logic processors can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor can include one or more physical processors configured to execute software instructions. Additionally or alternatively, the logic processor can include one or more hardware logic circuits or firmware devices configured to execute hardware-implemented logic or firmware instructions. Processors of the processing circuitry 402 can be single-core or multi-core, and the instructions executed thereon can be configured for sequential, parallel, and/or distributed processing. Individual components of the processing circuitry optionally can be distributed among two or more separate devices, which can be remotely located and/or configured for coordinated processing. For example, aspects of the computing system disclosed herein can be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 402.

Non-volatile storage device 406 includes one or more physical devices configured to hold instructions executable by the processing circuitry to implement the methods and processes described herein. When such methods and processes are implemented, the state of non-volatile storage device 406 can be transformed—e.g., to hold different data.

Non-volatile storage device 406 can include physical devices that are removable and/or built in. Non-volatile storage device 406 can include optical memory, semiconductor memory, and/or magnetic memory, or other mass storage device technology. Non-volatile storage device 406 can include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 can include physical devices that include random access memory. Volatile memory 404 is typically utilized by processing circuitry 402 to temporarily store information during processing of software instructions. It will be appreciated that volatile memory 404 typically does not continue to store instructions when power is cut to the volatile memory 404.

Aspects of processing circuitry 402, volatile memory 404, and non-volatile storage device 406 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of computing system 400 typically implemented in software by a processor to perform a particular function using portions of volatile memory, which function involves transformative processing that specially configures the processor to perform the function. Thus, a module, program, or engine can be instantiated via processing circuitry 402 executing instructions held by non-volatile storage device 406, using portions of volatile memory 404. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

When included, display subsystem 408 can be used to present a visual representation of data held by non-volatile storage device 406. The visual representation can take the form of a graphical user interface (GUI). As the herein described methods and processes change the data held by the non-volatile storage device, and thus transform the state of the non-volatile storage device, the state of display subsystem 408 can likewise be transformed to visually represent changes in the underlying data. Display subsystem 408 can include one or more display devices utilizing virtually any type of technology. Such display devices can be combined with processing circuitry 402, volatile memory 404, and/or non-volatile storage device 406 in a shared enclosure, or such display devices can be peripheral display devices.

When included, input subsystem 410 can comprise or interface with one or more user-input devices such as a keyboard, mouse, touch screen, camera, or microphone.

When included, communication subsystem 412 can be configured to communicatively couple various computing devices described herein with each other, and with other devices. Communication subsystem 412 can include wired and/or wireless communication devices compatible with one or more different communication protocols. As non-limiting examples, the communication subsystem can be configured for communication via a wired or wireless local- or wide-area network, broadband cellular network, etc. In some embodiments, the communication subsystem can allow computing system 400 to send and/or receive messages to and/or from other devices via a network such as the Internet.

Further, the disclosure comprises configurations according to the following clauses.

Clause 1. A computing system for self-validating augmented reality inspection of a component, the system comprising: processing circuitry communicatively coupled to non-volatile memory storing instructions that, when executed by the processing circuitry, cause the processing circuitry to: receive an image of the component in a real world environment captured by a camera oriented at a camera pose relative to a component in world space; determine a virtual camera pose relative to a CAD model of the component in a CAD environment that is substantially identical to the camera pose relative to the component in the world space; generate a CAD image via a virtual camera oriented at the virtual camera pose; generate a masked CAD image of the component by removing background from the CAD image; generate a composite image by superimposing the masked CAD image on the image of the component in the real world environment; provide the generated composite image to a trained latching model to thereby make a latching determination of whether the CAD image is latched to the captured image of the component in the real world environment, the trained latching model having been trained on a training dataset including a plurality of training dataset pairs, each pair including a composite image and a ground truth label indicating whether the composite image depicts a component and CAD image that are latched or unlatched; and output the latching determination.

Clause 2. The system according to Clause 1, further comprising a display configured to display the image of the component in the real world environment with an indication of the latching determination associated with the component.

Clause 3. The system according to any of Clauses 1-2, wherein outputting the latching determination includes outputting to a display a graphical indication of whether the CAD image is latched or unlatched to the component in the captured image of the real world environment.

Clause 4. The system according to any of Clauses 1-3, wherein the trained latching model includes a neural network that is configured to, at inference-time, receive the generated composite image and in response classify the generated composite image as latched or not latched.

Clause 5. The system according to Clause 4, wherein the neural network comprises one or more convolutional layers.

Clause 6. The system according to Clause 5, wherein the neural network further includes a plurality of fully connected hidden layers coupled on an input side to the convolutional layers.

Clause 7. The system according to Clause 6, wherein the neural network is configured as a binary classifier including an output layer coupled on an output side of the hidden layers, the output layer including at least one node corresponding to a positive latching determination.

Clause 8. The system according to any of Clauses 1-7, wherein the processing circuitry is further configured to: at training time, generate the training dataset at least in part by: generating a positive example training data pair, by: receiving a training time captured image of a training time component in a real environment; determining a matching virtual pose within a CAD program environment that is substantially identical to a camera pose in world space relative to the component in the training-time captured image; generating a matching CAD image that includes a projection of the CAD model as captured by the virtual camera at the matching virtual camera pose in the CAD program environment; generating a masked CAD image from the matching CAD image; superimposing the masked CAD image on the training time captured image to generate a latched composite image; and labeling the latched composite image with a positive latch ground truth label.

Clause 9. The system according to Clause 8, wherein the processing circuitry is further configured to: at training time, further generate the training dataset at least in part by: generating a plurality of negative example training data pairs at least in part by, for each negative training data pair: receiving the training time captured image of the training time component in the real environment in the positive training example data pair; generating a non-matching virtual pose that does not match the camera pose of the training time captured image; generating a non-matching CAD image at the non-matching virtual pose; generating a masked non-matching CAD image from the non-matching CAD image; superimposing the masked non-matching CAD image onto the captured image to generate a non-latched composite image; and labeling the non-latched composite image with a negative latch ground truth label.

Clause 10. The system according to Clause 9, wherein the processing circuitry is further configured to train the trained latching model on the training dataset including the positive example training data pair and the negative example training data pairs using a backpropagation algorithm.

Clause 11. A method for training a latching model for self-validating augmented reality inspection of a component, the method comprising: at training time, generating a training dataset at least in part by: generating a positive example training data pair, by: receiving a training time captured image of a training time component in a real environment; determining a matching virtual pose within a CAD program environment that is substantially identical to a camera pose in world space relative to the component in the training-time captured image; generating a matching CAD image that includes a projection of the CAD model as captured by the virtual camera at the matching virtual camera pose in the CAD program environment; generating a masked CAD image from the matching CAD image; superimposing the masked CAD image on the training time captured image to generate a latched composite image; and labeling the latched composite image with a positive latch ground truth label.

Clause 12. The method according to Clause 11, further comprising: at training time, further generating the training dataset at least in part by: generating a plurality of negative example training data pairs at least in part by, for each negative training data pair: receiving the training time captured image of the training time component in the real environment in the positive training example data pair; generating a non-matching virtual pose that does not match the camera pose of the training time captured image; generating a non-matching CAD image at the non-matching virtual pose; generating a masked non-matching CAD image from the non-matching CAD image; superimposing the masked non-matching CAD image onto the captured image to generate a non-latched composite image; and labeling the non-latched composite image with a negative latch ground truth label.

Clause 13. The method according to Clause 12, further comprising: training the latching model on the training dataset including the positive example training data pair and the negative example training data pairs using a backpropagation algorithm, to generate a trained latching model.

Clause 14. The method according to any of Clauses 11-13, wherein the latching model includes a convolutional neural network.

Clause 15. A method for self-validating augmented reality inspection of a component, the method comprising: receiving an image of the component in a real world environment captured by a camera oriented at a camera pose relative to a component in world space; determining a virtual camera pose relative to a CAD model of the component in a CAD environment that is substantially identical to the camera pose relative to the component in the world space; generating a CAD image via a virtual camera oriented at the virtual camera pose; generating a masked CAD image of the component by removing background from the CAD image; generating a composite image by superimposing the masked CAD image on the image of the component in the real world environment; providing the generated composite image to a trained latching model to thereby make a latching determination of whether the CAD image is latched to the captured image of the component in the real world environment, the trained latching model having been trained on a training dataset including a plurality of training dataset pairs, each pair including a composite image and a ground truth label indicating whether the composite image depicts a component and CAD image that are latched or unlatched; and outputting the latching determination.

Clause 16. The method according to Clause 15, further comprising: displaying the image of the component in the real world environment with an indication of the latching determination associated with the component.

Clause 17. The method according to any of Clauses 15-16, wherein outputting the latching determination includes outputting to a display a graphical indication of whether the CAD image is latched or unlatched to the component in the captured image of the real world environment.

Clause 18. The method according to any of Clauses 15-17, wherein the trained latching model includes a neural network that is configured to, at inference-time, receive the generated composite image and in response classify the generated composite image as latched or not latched.

Clause 19. The method according to Clause 18, wherein the neural network comprises one or more convolutional layers and a plurality of fully connected hidden layers.

Clause 20. The method according to Clause 19, wherein the neural network is configured as a binary classifier including an output layer coupled on an output side of the hidden layers, the output layer including at least one node corresponding to a positive latching determination.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for self-validating augmented reality inspection of a component, the system comprising:
   processing circuitry communicatively coupled to non-volatile memory storing instructions that, when executed by the processing circuitry, cause the processing circuitry to:
   receive an image of the component in a real world environment captured by a camera oriented at a camera pose relative to a component in world space;
   determine a virtual camera pose relative to a CAD model of the component in a CAD environment that is substantially identical to the camera pose relative to the component in the world space;
   generate a CAD image via a virtual camera oriented at the virtual camera pose;
   generate a masked CAD image of the component by removing background from the CAD image;
   generate a composite image by superimposing the masked CAD image on the image of the component in the real world environment;
   provide the generated composite image to a trained latching model to thereby make a latching determination of whether the CAD image is latched to the captured image of the component in the real world environment, the trained latching model having been trained on a training dataset including a plurality of training dataset pairs, each pair including a composite image and a ground truth label indicating whether the composite image depicts a component and CAD image that are latched or unlatched; and
   output the latching determination.

2. The system of claim 1, further comprising a display configured to display the image of the component in the real world environment with an indication of the latching determination associated with the component.

3. The system of claim 1, wherein outputting the latching determination includes outputting to a display a graphical indication of whether the CAD image is latched or unlatched to the component in the captured image of the real world environment.

4. The system of claim 1, wherein the trained latching model includes a neural network that is configured to, at inference-time, receive the generated composite image and in response classify the generated composite image as latched or not latched.

5. The system of claim 4, wherein the neural network comprises one or more convolutional layers.

6. The system of claim 5, wherein the neural network further includes a plurality of fully connected hidden layers coupled on an input side to the convolutional layers.

7. The system of claim 6, wherein the neural network is configured as a binary classifier including an output layer coupled on an output side of the hidden layers, the output layer including at least one node corresponding to a positive latching determination.

8. The system of claim 1, wherein the processing circuitry is further configured to:
   at training time, generate the training dataset at least in part by:
   generating a positive example training data pair, by:
   receiving a training time captured image of a training time component in a real environment;
   determining a matching virtual pose within a CAD program environment that is substantially identical to a camera pose in world space relative to the component in the training-time captured image;
   generating a matching CAD image that includes a projection of the CAD model as captured by the virtual camera at the matching virtual camera pose in the CAD program environment;
   generating a masked CAD image from the matching CAD image;
   superimposing the masked CAD image on the training time captured image to generate a latched composite image; and
   labeling the latched composite image with a positive latch ground truth label.

9. The system of claim 8, wherein the processing circuitry is further configured to:
   at training time, further generate the training dataset at least in part by:
   generating a plurality of negative example training data pairs at least in part by, for each negative training data pair:
   receiving the training time captured image of the training time component in the real environment in the positive training example data pair;
   generating a non-matching virtual pose that does not match the camera pose of the training time captured image;
   generating a non-matching CAD image at the non-matching virtual pose;
   generating a masked non-matching CAD image from the non-matching CAD image;
   superimposing the masked non-matching CAD image onto the captured image to generate a non-latched composite image; and
   labeling the non-latched composite image with a negative latch ground truth label.

10. The system of claim 9, wherein the processing circuitry is further configured to train the trained latching model on the training dataset including the positive example training data pair and the negative example training data pairs using a backpropagation algorithm.

11. A method for training a latching model for self-validating augmented reality inspection of a component, the method comprising:
   at training time, generating a training dataset at least in part by:
   generating a positive example training data pair, by:
   receiving a training time captured image of a training time component in a real environment;
   determining a matching virtual pose within a CAD program environment that is substantially identical to a camera pose in world space relative to the component in the training-time captured image;
   generating a matching CAD image that includes a projection of the CAD model as captured by the virtual camera at the matching virtual camera pose in the CAD program environment;
   generating a masked CAD image from the matching CAD image;

superimposing the masked CAD image on the training time captured image to generate a latched composite image; and labeling the latched composite image with a positive latch ground truth label.

12. The method of claim 11, further comprising:

at training time, further generating the training dataset at least in part by:

generating a plurality of negative example training data pairs at least in part by, for each negative training data pair:

receiving the training time captured image of the training time component in the real environment in the positive training example data pair;

generating a non-matching virtual pose that does not match the camera pose of the training time captured image;

generating a non-matching CAD image at the non-matching virtual pose;

generating a masked non-matching CAD image from the non-matching CAD image;

superimposing the masked non-matching CAD image onto the captured image to generate a non-latched composite image; and labeling the non-latched composite image with a negative latch ground truth label.

13. The method of claim 12, further comprising:

training the latching model on the training dataset including the positive example training data pair and the negative example training data pairs using a backpropagation algorithm, to generate a trained latching model.

14. The method of claim 11, wherein the latching model includes a convolutional neural network.

15. A method for self-validating augmented reality inspection of a component, the method comprising:

receiving an image of the component in a real world environment captured by a camera oriented at a camera pose relative to a component in world space;

determining a virtual camera pose relative to a CAD model of the component in a CAD environment that is substantially identical to the camera pose relative to the component in the world space;

generating a CAD image via a virtual camera oriented at the virtual camera pose;

generating a masked CAD image of the component by removing background from the CAD image;

generating a composite image by superimposing the masked CAD image on the image of the component in the real world environment;

providing the generated composite image to a trained latching model to thereby make a latching determination of whether the CAD image is latched to the captured image of the component in the real world environment, the trained latching model having been trained on a training dataset including a plurality of training dataset pairs, each pair including a composite image and a ground truth label indicating whether the composite image depicts a component and CAD image that are latched or unlatched; and outputting the latching determination.

16. The method of claim 15, further comprising:

displaying the image of the component in the real world environment with an indication of the latching determination associated with the component.

17. The method of claim 15, wherein outputting the latching determination includes outputting to a display a graphical indication of whether the CAD image is latched or unlatched to the component in the captured image of the real world environment.

18. The method of claim 15, wherein the trained latching model includes a neural network that is configured to, at inference-time, receive the generated composite image and in response classify the generated composite image as latched or not latched.

19. The method of claim 18, wherein the neural network comprises one or more convolutional layers and a plurality of fully connected hidden layers.

20. The method of claim 19, wherein the neural network is configured as a binary classifier including an output layer coupled on an output side of the hidden layers, the output layer including at least one node corresponding to a positive latching determination.

* * * * *